US005339923A

United States Patent [19]

Chen

[11] Patent Number: 5,339,923

[45] Date of Patent: Aug. 23, 1994

[54] ROTATING MECHANISM FOR A CRYSTAL BALL

[76] Inventor: Joseph Chen, P.O. Box 82-144, Taipei, Taiwan

[21] Appl. No.: 38,260

[22] Filed: Mar. 29, 1993

[51] Int. Cl.[5] .......................... F03G 1/00; G09F 19/08

[52] U.S. Cl. .......................................... 185/39; 40/411; 84/95.2; 446/236; 464/160

[58] Field of Search ....................... 185/37, 39; 40/411; 84/95.2; 446/236, 267; 464/160

[56] References Cited

U.S. PATENT DOCUMENTS

| | | | |
|---|---|---|---|
| 2,552,682 | 5/1951 | Lopez | 464/160 |
| 5,070,633 | 12/1991 | Liu | 40/411 |
| 5,088,218 | 2/1992 | Liu | 84/95.2 X |
| 5,134,795 | 8/1992 | Wang | 84/95.2 X |

*Primary Examiner*—Allan D. Herrmann
*Attorney, Agent, or Firm*—Alfred Lei

[57] ABSTRACT

This invention relates to a rotating mechanism for a crystal ball including a spring means, a driving gear connected with the spring means, a driven gear engaged with the driving gear and having a rectangular protuberance at the center, a supporting frame mounted on the driven gear and having a hole for receiving the rectangular protuberance of the driven gear, a turning member arranged on the supporting frame and formed with a rectangular hole adapted to receive the rectangular protuberance of the driven gear and two arms extending upwardly from two ends thereof, a rod installed on the turning member and having a rectangular hole, and a disc having a downwardly depending rod with a rectangular end adapted to be received in the rectangular rod of the rod.

1 Claim, 3 Drawing Sheets

ROTATING MECHANISM FOR A CRYSTAL BALL

BACKGROUND OF THE INVENTION

It has been found that the conventional rotating mechanism for a crystal ball is too complex in construction hence rendering it expensive to manufacture. Further, the doll is often blocked as the foam plastic within the crystal ball is engaged with the rotating mechanism. In addition, the rotating mechanism is complicated in structure and difficult to assemble.

Therefore, it is an object of the present invention to provide an improved rotating mechanism for a crystal ball which may obviate and mitigate the above-mentioned drawbacks.

SUMMARY OF THE INVENTION

This invention relates to an improved rotating mechanism for a crystal ball.

It is the primary object of the present invention to provide an improved rotating mechanism for a crystal ball which may ensure the doll thereon to rotate smoothly.

It is another object of the present invention to provide an improved rotating mechanism for a crystal ball which is economic to produce.

It is still another object of the present invention to provide an improved rotating mechanism for a crystal ball which is facile to assemble.

It is still another object of the present invention to provide an improved rotating mechanism for a crystal ball which is easy to manufacture.

It is a further object of the present invention to provide an improved rotating mechanism for a crystal ball which is simple in construction.

Other objects and merits and a fuller understanding of the the present invention will be obtained by those having ordinary skill in the art when the following detailed description of the preferred embodiment is read in conjunction with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
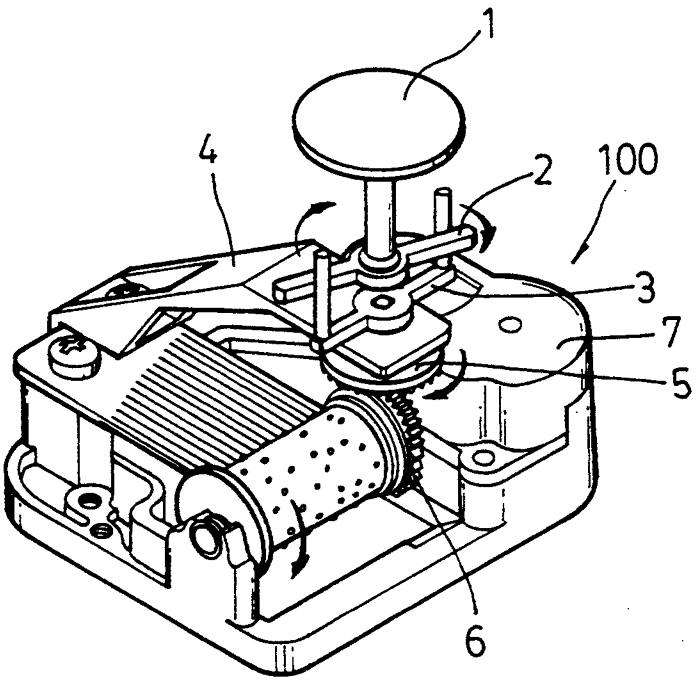
FIG. 1 is a perspective view of the present invention.
Figure 2:
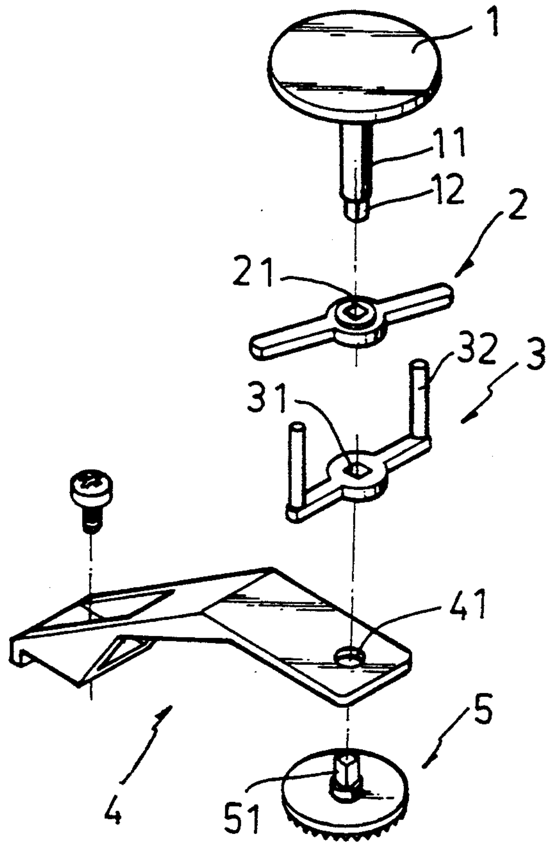
FIG. 2 is an exploded view of the present invention.
Figure 3:
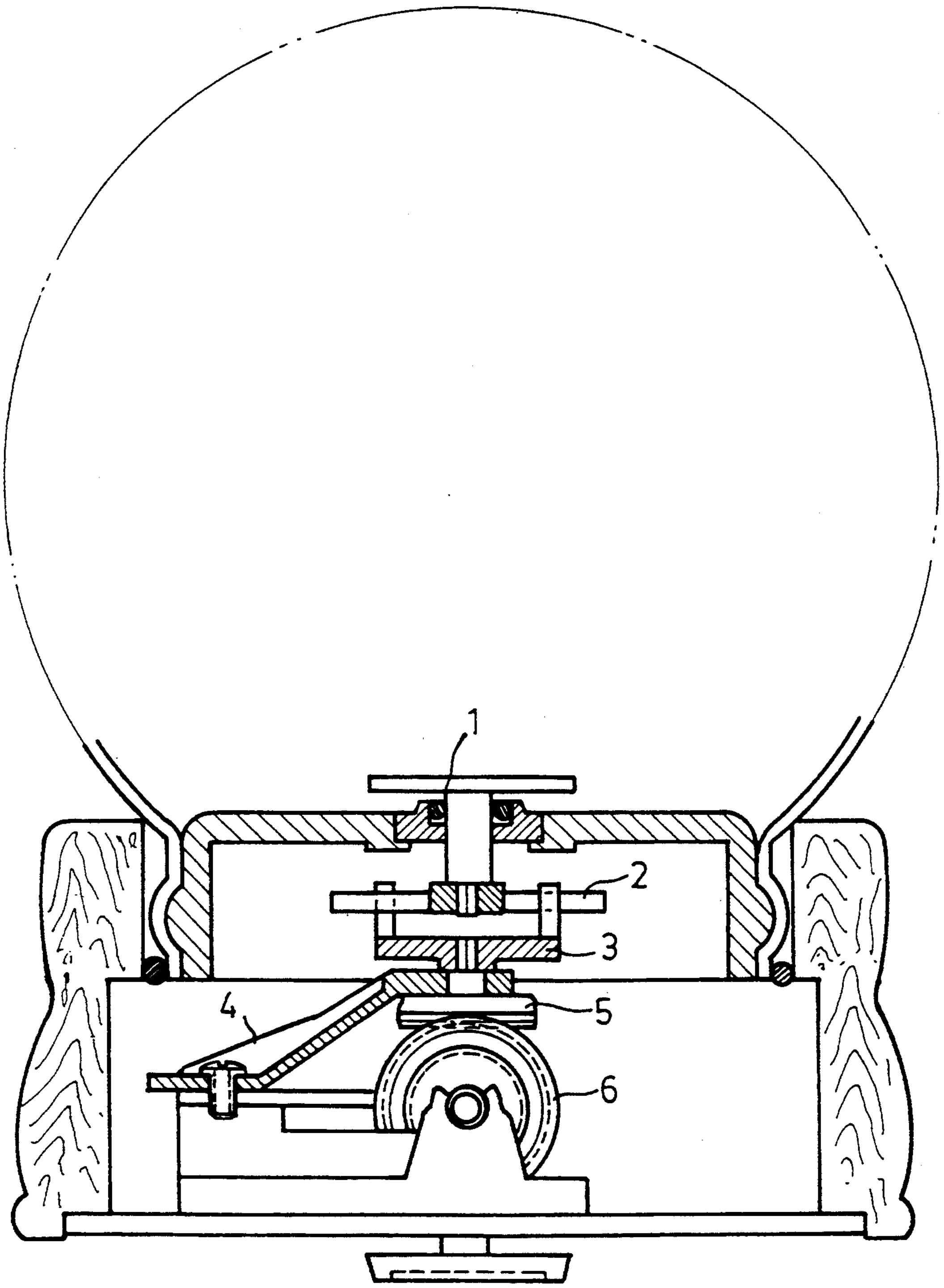
FIG. 3 is a sectional view of the present invention.

With reference to the drawings and in particular to FIGS. 1 and 2 thereof, the rotating mechanism 100 for a crystal ball according to the present invention mainly comprises a disc 1, a rod 2, a turning member 3, a supporting frame 4, a driven gear 5, a driving gear 6 and a spring means 7.

The spring means 7 is well known in the art and has no need to be mentioned here in detail. The spring means 7 is connected with the driving gear 6 and so it will make the driving gear 6 rotate when releasing its stored energy, The driving gear 6 is meshed with the driven gear 5 so that the driven gear 5 will rotate in unison with the driving gear 6. Further, the driven gear 5 is provided with a rectangular protuberance 51 at the center. The supporting frame 4 has a hole 41 and mounted on the driven gear 5 and so the rectangular protuberance 51 extends upwardly through the hole 41 of the supporting frame 4. The turning member 3 is arranged on the supporting frame 4 and is formed with a rectangular hole 31 adapted to receive the rectangular protuberance 51 of the driven gear 5 and two arms 32 extending upwardly from two ends thereof. The rod 2 is installed on the turning member 3 and has a rectangular hole 21. The center of the disc 1 has a downwardly depending portion 11 with a rectangular end 12 adapted to be received in the rectangular hole 21 of the rod 2.

As the spring means 7 is turned to store energy and then released, the spring means 7 will drive the driving gear 6 to rotate. Thereafter, the driving gear 6 will drive the driven gear 5 to turn. At the time when the driven gear 5 is rotated, the rectangular protuberance 51 of the driven gear 5 will rotate the turning member 3. Then, the two arms 32 of the turning member 3 will push the rod 2 to rotate. Meanwhile, the rod 2 rotates the disc 1 through the engagement of the rectangular hole 21 of the rod 2 with the rectangular end 12 of the disc 1. Hence, the doll mounted on the disc 1 will be rotated with the disc 1.

Although the present invention has been described with a certain degree of particularity, it is understood that the present invention disclosure is made by way of example only and that numerous changes in the detail of construction and the combination and arrangement of parts may be resorted to without departing from the spirit and scope of the invention as hereinafter claimed.

I claim:

1. A rotating mechanism for a crystal ball comprising:
   - a spring means;
   - a vertically disposed driving gear connected with said spring means;
   - a horizontally disposed driving gear engaged with said vertically disposed driving gear and having a rectangular protuberance of said driven gear;
   - a supporting frame mounted on said driven gear and having a hole for receiving the rectangular protuberance of said driven gear;
   - a turning member arranged on said supporting frame and formed with a rectangular hole adapted to receive the rectangular protuberance of said driven gear and two arms extending upwardly from two ends thereof;
   - a rod installed on said turning member and having a rectangular hole; and
   - a disc having a downwardly depending portion with a rectangular end adapted to be received in the rectangular hole of said rod.

* * * * *